United States Patent [19]
Kiya

[11] Patent Number: 6,084,565
[45] Date of Patent: Jul. 4, 2000

[54] IMAGE MONITORING APPARATUS

[75] Inventor: Yoshiyuki Kiya, Nishinomiya, Japan

[73] Assignee: Furuno Electric Company Limited, Hyogo-Ken, Japan

[21] Appl. No.: 08/694,261

[22] Filed: Aug. 8, 1996

[30] Foreign Application Priority Data

Aug. 8, 1995 [JP] Japan .................................... 7-201984

[51] Int. Cl.[7] ...................................................... G09G 5/00
[52] U.S. Cl. .......................... 345/115; 345/127; 345/121
[58] Field of Search ................................... 345/127, 128, 345/129, 130, 131, 132, 133, 115, 112, 113, 114, 118, 122; 348/442; 342/36

[56] References Cited

U.S. PATENT DOCUMENTS 4,546,349  10/1985  Prohofsky et al. .
4,729,029   3/1988  Henri et al. .
5,182,728   1/1993  Shen et al. .

FOREIGN PATENT DOCUMENTS 63-241480  10/1988  Japan .
   275588   6/1990  Japan .

OTHER PUBLICATIONS

The Patent Office—4790598 INSPEC abstract No. B9411-7650C-008.
Front page of Japanese unexamined patent publication 5-273348, which corresponds to U.S. Patent 5,182,728 listed above.

Primary Examiner—Xiao Wu

[57] ABSTRACT

In one aspect of the invention, an image monitoring apparatus has a plurality of display windows created on a single screen for presenting target objects existing within a monitoring area, wherein an image of the monitoring area and an image of a particular portion of the monitoring area are displayed in separate display windows with reference directions of the individual images aligned independently of each other with a specified direction of the screen. In another aspect of the invention, an image monitoring apparatus capable of detecting target objects existing within a monitoring area and displaying an image of detected target objects on a screen makes it possible to set a particular area of interest within the monitoring area, wherein the apparatus continuously displays a target image of the area of interest regardless of a movement of a point of observation or a change in the direction of the area of interest.

20 Claims, 19 Drawing Sheets

HEADING LINE

HEADING LINE

HEADING LINE

HEADING LINE

IMAGE MONITORING APPARATUS

BACKGROUND OF THE INVENTION

1. Field of the Invention

The present invention relates to an image monitoring apparatus such as a radar apparatus, a scanning sonar apparatus and a course plotting apparatus, for example.

2. Description of the Prior Art

Conventionally known technology used in a radar apparatus, for example, includes a zoom function which allows an operator to enlarge a desired portion of a whole radar coverage for observing smaller details within a particular area of interest. A commonly used technique in this kind of zoom function is to place a cross-hair cursor (a pair of intersecting lines for specifying a particular location on a screen) at the center of an area to be zoomed and operate a key to execute the zoom function, whereby an enlarged image of the area around the cursor position is presented on the screen at a varied range scale.

A conventional scanning sonar transmits and receives ultrasonic signals at a set tilt angle and provides a two-dimensional presentation of underwater objects detected within a whole sounding area around the ship on a display screen.

A course plotting device of a conventional type successively determines positions of a ship and displays its past track overlaid with an electronically generated chart of a relevant area on a screen. The course plotting device usually has the capability to display the ship's plotted track and chart on the entire screen in three presentation modes: i.e., north-up mode in which the geographical north is maintained in the screen top direction, head-up mode in which the ship's heading is directed in the screen top direction, and course-up mode in which the ship's intended course is stabilized in the screen top direction.

The zoom function of the aforementioned conventional radar provides an enlarged view of target blips existing in an operator-selected area of interest (zooming area) within the whole radar coverage. This function enables the operator to observe that particular area with special attention focused thereon. When the zoom function is executed on the conventional radar, however, the on-screen image is entirely overwritten. The zoom function of the prior art has, therefore, been associated with a problem that it is difficult to recognize a positional relationship between the whole radar coverage and the zooming area.

A previous approach directed to the solution of the above problem is, as disclosed in Japanese Unexamined Patent Publication No. 63-241480 (1988), Japanese Unexamined Utility Model Publication No. 2-75588 (1990) and Japanese Unexamined Patent Publication No. 5-273348 (1993), to present a plurality of images in different range scales in respective display areas (or "windows") provided on a single screen. According to such a prior art windowing technique, the images displayed in the individual windows on the screen have a common orientation in azimuth. In other words, it has been impossible to present radar images with different reference directions in the individual windows to meet specific requirements. Although the prior art technique makes it possible to present an enlarged image of a particular portion specified within the whole radar coverage in a separate zooming window for focusing on targets within that portion, the targets shown in the enlarged image would easily go out of the zooming window if an observer's own ship travels a certain distance or alters its heading.

It has not been possible for either the conventional scanning sonar or course plotting device to show a plurality of windows on a single screen and present part of an image shown on one window on another window.

SUMMARY OF THE INVENTION

It is an object of the invention to provide an image monitoring apparatus capable of displaying target objects existing within a monitoring area, in which an image of the whole monitoring area and an image of a particular portion of the whole monitoring area are displayed in separate display windows created on a screen with reference directions of the individual images aligned independently of each other with a specified direction of the screen.

It is another object of the invention to provide an image monitoring apparatus capable of detecting target objects existing within a monitoring area and continuously displaying an image of those target objects existing in a zooming area set within the monitoring area regardless of a movement of the point of observation or a change in the direction of the zooming area.

In one feature of the invention, an image monitoring apparatus which displays target objects existing within a monitoring area on a screen comprises a display controller for displaying an image of the whole monitoring area and an image of a particular portion of the whole monitoring area sampled or generated by an image sampling/generating circuit in separate display windows created on the same screen with reference directions of the individual images aligned independently of each other with a specified direction of the screen.

The image monitoring apparatus thus constructed can present the images of the whole monitoring area and the particular portion thereof in the separate display windows created on the screen with the reference directions of the individual images aligned independently of each other with the specified direction of the screen.

This arrangement allows an operator to observe the target objects and other features of the monitoring area from more than one point of view and zoom in on an important part of the whole monitoring area.

In another feature of the invention, an image monitoring apparatus which detects target objects existing within a monitoring area centered around a point of observation and displays an image of detected target objects on a screen comprises a zooming area setter for setting a zooming area within the monitoring area, an image sampling/generating circuit for continuously sampling or generating an image of target objects existing within the zooming area regardless of a movement of the point of observation or a change in the direction of the zooming area, and a display controller for displaying the image of the zooming area sampled or generated by the image sampling/generating circuit.

The image monitoring apparatus thus constructed enables an operator to set a particular area of interest (zooming area) within the monitoring area, wherein the apparatus continuously displays a target image of the zooming area regardless of a movement of a ship (point of observation) or a change in the ship's heading, for example, allowing the operator to focus special attention on the zooming area.

In still another feature of the invention, an image monitoring apparatus which detects target objects existing within a monitoring area and displays an image of detected target objects on a screen comprises a zooming area setter for setting a zooming area within the monitoring area, a display controller for sampling an image of target objects existing within the set zooming area and individually displaying the image of the zooming area and the image of the whole monitoring area in separate display windows created on the same screen, and a zooming area indicator for displaying a symbol indicating the zooming area in the display window covering the whole monitoring area.

When a zooming area is set within the monitoring area, the image monitoring apparatus shows a symbol indicating the size and location of the zooming area in the display window covering the whole monitoring area. This allows an operator to easily recognize a relationship between the areas presented in the individual display windows.

In yet another feature of the invention, an image monitoring apparatus which detects target objects existing within a monitoring area centered around a ship by use of a radar and displays images of detected target objects in a plurality of display windows created on a single screen comprises a range selector for setting a display range for each of the display windows, a plurality of fast time constant (FTC) circuits for differentiating radar echo signals by applying time constants suited for individual display range settings, a plurality of image sampling/generating circuits for sampling or generating images for the individual display windows in accordance with the respective display range settings based on output signals of the relevant FTC circuits, and a display controller for displaying the images sampled or generated by the image sampling/generating circuits in the relevant display windows.

With the image monitoring apparatus thus constructed, it is possible to properly suppress precipitation clutter caused by rain or snow in the individual display windows according to the respective display range settings.

In a further feature of the invention, an image monitoring apparatus which detects target objects existing within a monitoring area centered around a ship by use of a radar and displays images of detected target objects in a larger display window and a smaller display window created on a single screen comprises a presentation mode selector for setting one display window to north-up mode or course-up mode and the other display window to head-up mode, and a display controller for displaying the images of the detected target objects in the selected presentation modes in the relevant display windows.

With this image monitoring apparatus, it is possible to use one display window to monitor a target image in relation to the ship's forward direction and the other display window to monitor a target image in relation to a predetermined reference direction.

In a still further feature of the invention, an image monitoring apparatus which detects target objects existing within a monitoring area centered around a ship by use of a radar and displays images of detected target objects in a larger display window and a smaller display window created on a single screen comprises a display controller for displaying an image of target objects detected within a specified zooming area in the larger display window and an image of target objects detected within an area larger than the zooming area in the smaller display window.

With this arrangement, the image presented in the smaller display window allows an operator to easily recognize situations over the large monitoring area while the image shown in the larger display window enables detailed observation of the target objects detected within the zooming area.

In a yet further feature of the invention, an image monitoring apparatus which detects target objects existing within a monitoring area centered around a ship by use of a radar and displays images of detected target objects in a larger display window and a smaller display window created on a single screen comprises a presentation mode selector for setting one display window to north-up mode or course-up mode and the other display window to head-up mode, a range selector for setting a larger display range for the smaller display window than a display range set for the larger display window, and a display controller for displaying the images of the detected target objects in the selected presentation modes and display ranges in the relevant display windows.

With this image monitoring apparatus, it is possible to use one display window to monitor a target image in relation to the ship's forward direction and the other display window to monitor a target image in relation to a predetermined reference direction. In addition, the image presented in the smaller display window allows an operator to easily recognize situations over the large monitoring area while the image shown in the larger display window enables detailed observation of the target objects detected within the zooming area.

FIG. 1 is a block diagram depicting an example configuration of an image monitoring apparatus corresponding to the claims. In the block diagram of FIG. 1, image sampling/generating circuits 1 and 2 individually receive information for on-screen presentation of target objects and symbols existing within a monitoring area, sample or generate an image of the whole monitoring area and an image of a particular portion of the whole monitoring area, and write data on the individual images in image memories 5 and 6. In doing so, the image sampling/generating circuits 1 and 2 also receive information on reference directions of the individual images, whereby the data on the individual images are so prepared that the reference directions of the individual images are aligned with a specified direction of a display screen. Display signal generators 7 and 8 read the image data stored in the image memories 5 and 6, respectively, by executing an addressing sequence which is synchronized with a scanning sequence of a monitor 11, and produce video signals from the image data. A window controller 10 controls a switching circuit 9 in such a way that it transmits an output signal of the display signal generator 7 and an output signal of the display signal generator 8 to the monitor 11. As a result, the individual images are presented in two dedicated display windows created on the screen of the monitor 11, the images being oriented independently of each other in accordance with their reference directions.

FIG. 2 is a block diagram depicting an example configuration of an image monitoring apparatus corresponding to the claims. In the block diagram of FIG. 2, image sampling/generating circuits 1 and 2 individually receive information for on-screen presentation of target objects and symbols existing within a monitoring area. The image sampling/generating circuit 1 samples or generates an image of the monitoring area and writes data on the image in an image memory 5. A zooming area setter 3 sets a zooming area within the monitoring area with reference to a point of observation. The image sampling/generating circuit 2 samples or generates an image of the zooming area regardless of a movement of the point of observation or a change in the direction of the zooming area based on information on the specified zooming area as well as the movement of the point of observation and change in the direction of the zooming area and writes data on the image in an image memory 6. A display controller 4 has the same configuration as shown in FIG. 1. Accordingly, the image monitoring apparatus continuously presents the image of the whole monitoring area, for example, in one display window and the image of the specified zooming area in another display window even when the point of observation moves or its viewing direction changes.

These and other objects, features and advantages of the invention will become more apparent upon reading the following detailed description of the preferred embodiments with reference to the appended drawings.

DETAILED DESCRIPTION OF THE PREFERRED EMBODIMENTS OF THE INVENTION

A radar according to a first embodiment of the invention is now described with reference to FIGS. 3 to 13.

Figure 1:
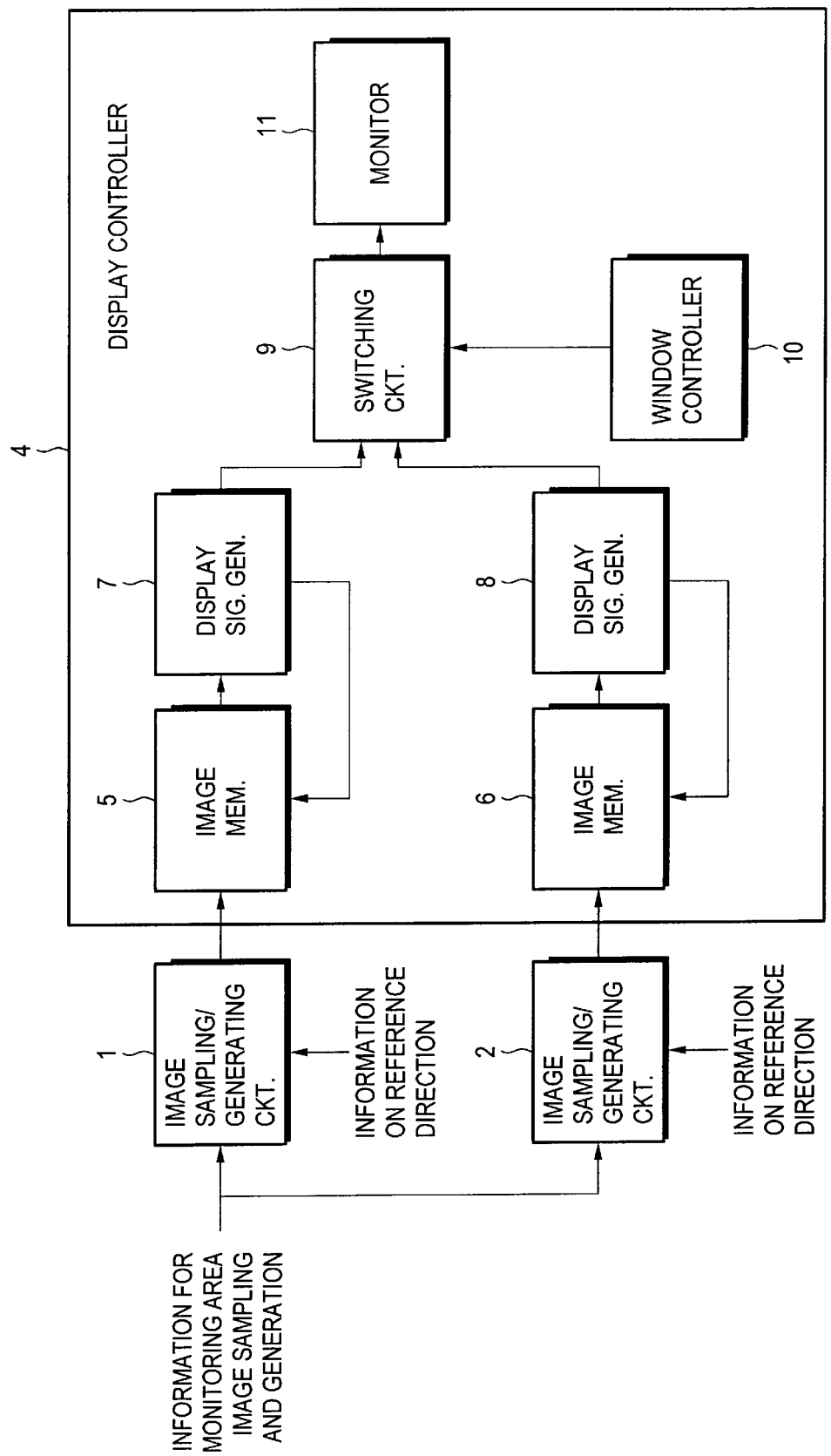
FIG. 1 is a block diagram of an embodiment according to the present invention.
Figure 2:
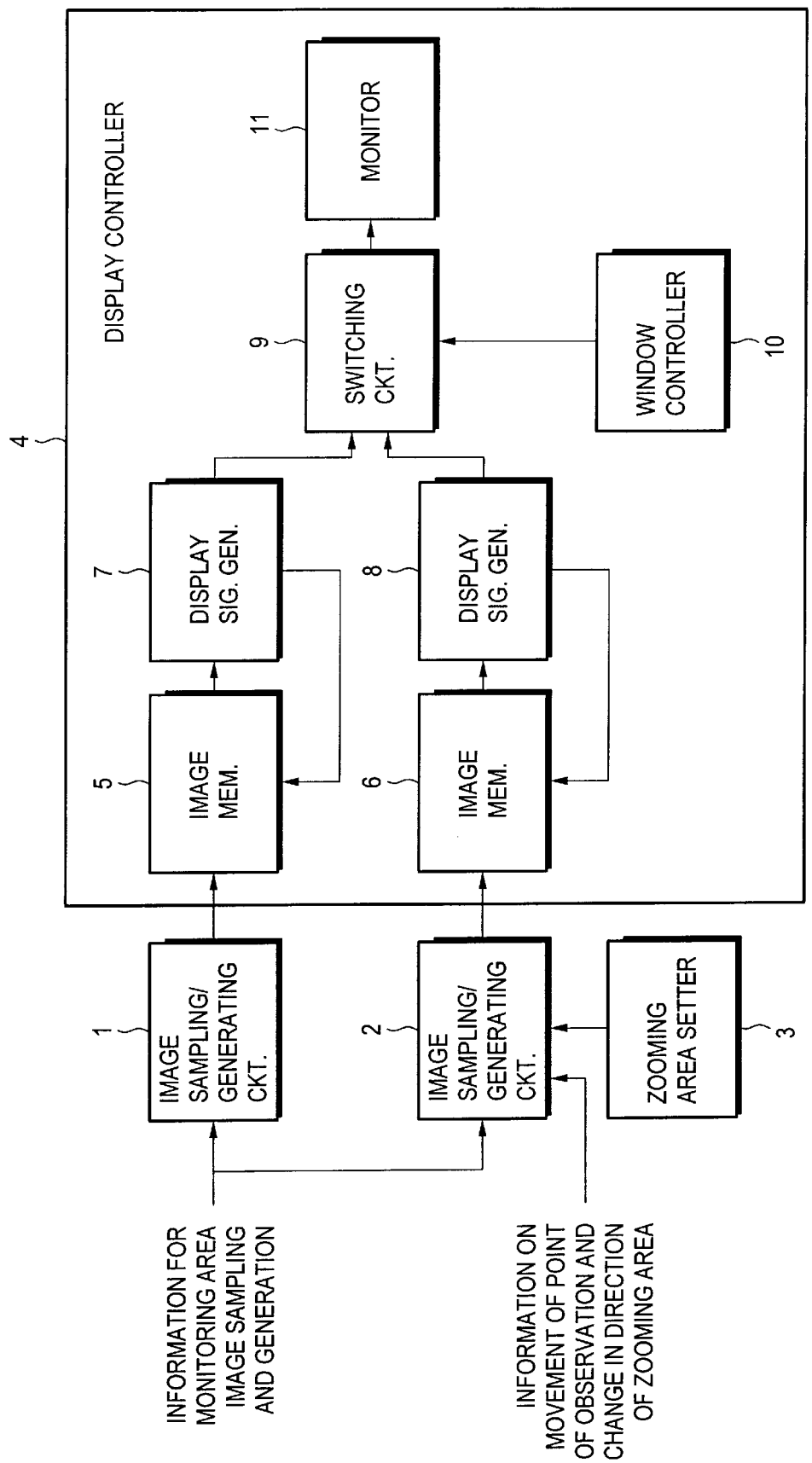
FIG. 2 is a block diagram of another embodiment according to the present invention.
Figure 3:
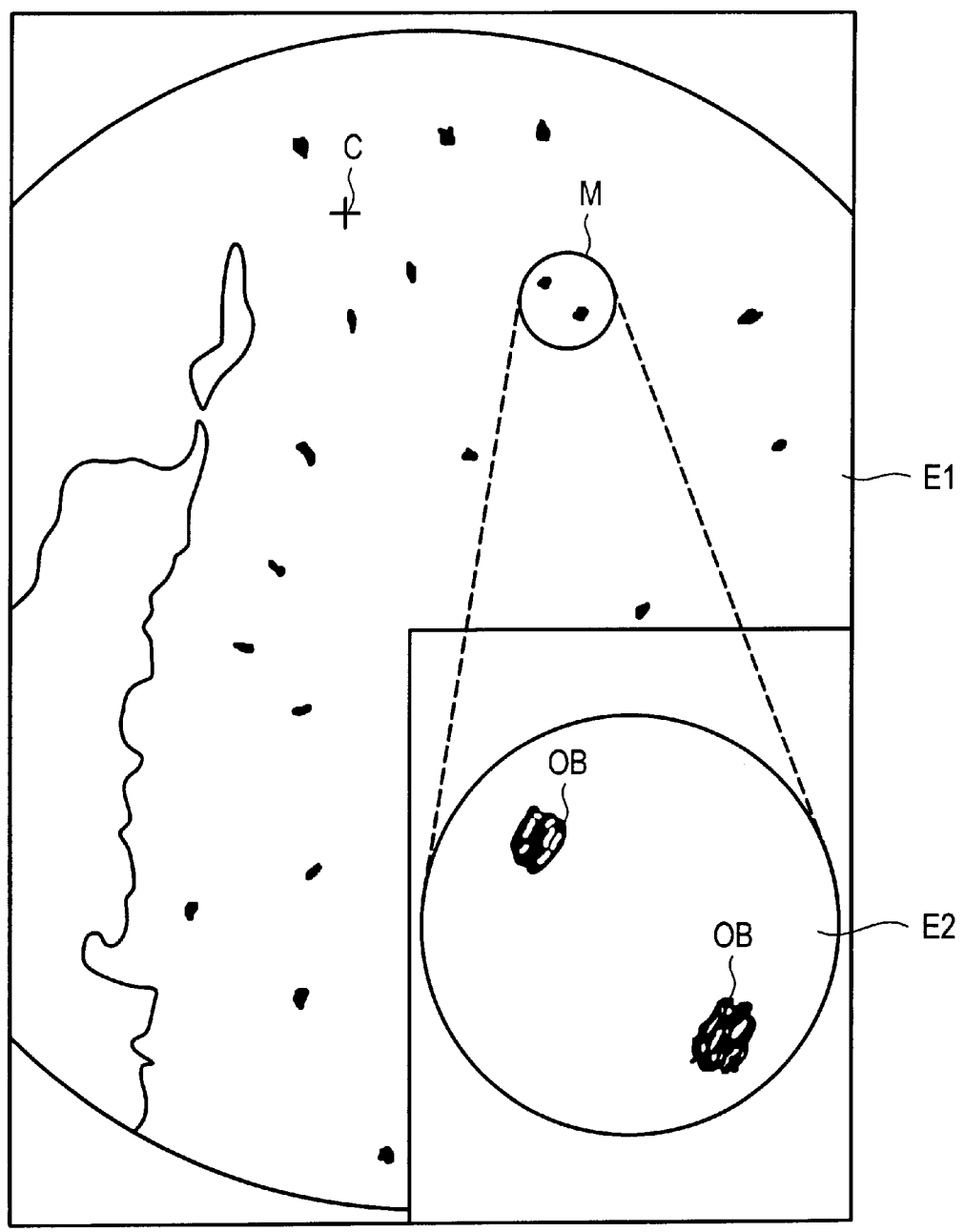
FIG. 3 is a diagram illustrating an example of a picture displayed by a radar according to a first embodiment of the invention.

FIG. 3 is a diagram showing an example of a picture displayed by the radar of the first embodiment, in which the area designated by E1 is a display area covering about ¾ of the full screen while the area designated by E2 is a display area taking up about ¼ lower-right portion of the full screen. The display area E1 presents a radar image including echoes of land masses, surrounding target ships and other objects on a specific range scale with an observer's own ship located at the center of the screen. The display area E2 presents an enlarged view of a particular area of interest (zooming area) shown by a circular symbol associated with the letter M within the display area E1. In the example of FIG. 3, there are shown two targets OB detected by the radar in the display area E2. The circular symbol M marked in the display area E1 indicates to which part of the display area E1 the image enlarged in the display area E2 corresponds. The display areas E1 and E2 are hereinafter referred to as a larger window and a smaller window, respectively.

Figure 4A:
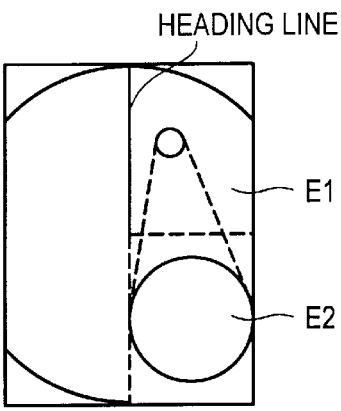
FIGS. 4(A) to 4(D) are diagrams illustrating how images shown in a larger window and a smaller window created on a radar screen of the first embodiment are interrelated to each other.
Figure 4B:
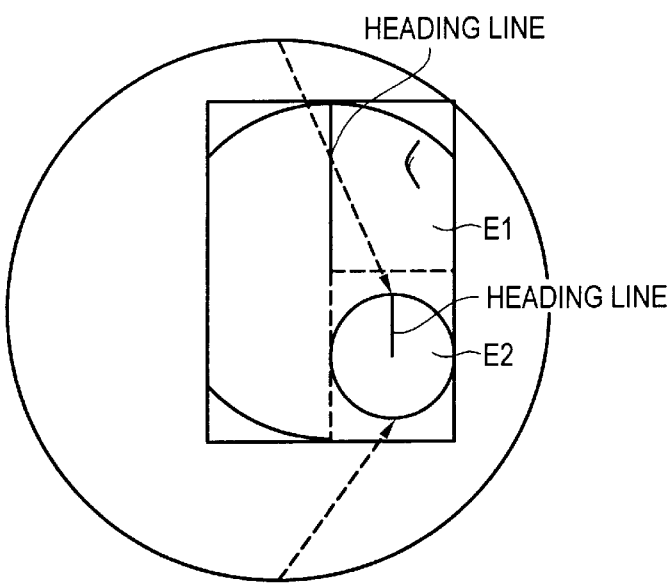
Figure 4C:
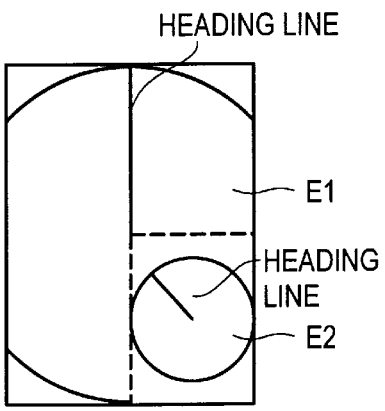
Figure 4D:
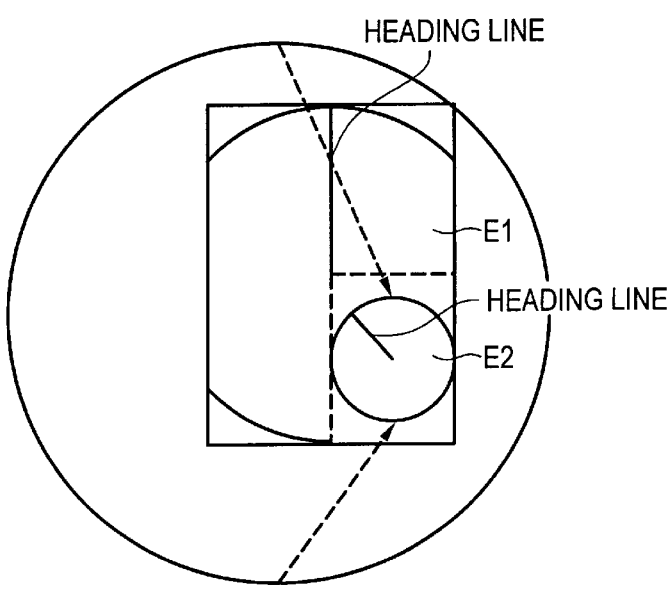
Figure 5A:
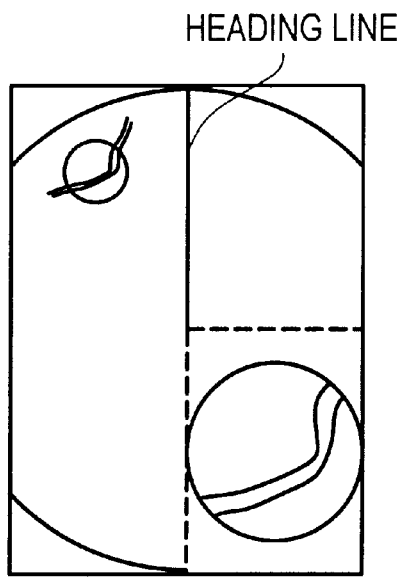
FIGS. 5(A) to 5(D) are diagrams illustrating how the radar picture varies as a result of a ship's movement according to the first embodiment.
Figure 5B:
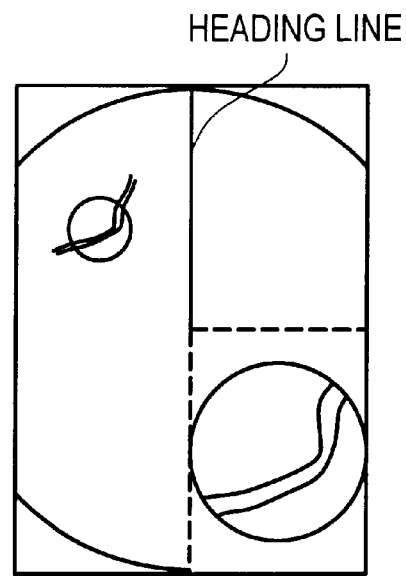
Figure 5C:
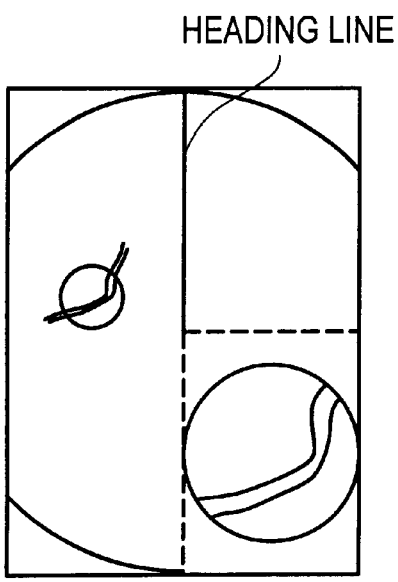
Figure 5D:
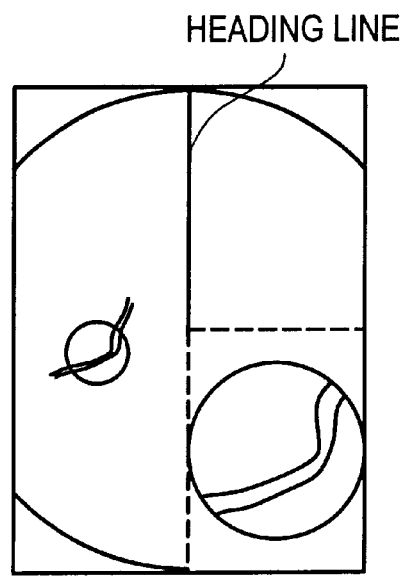
Figure 6A:
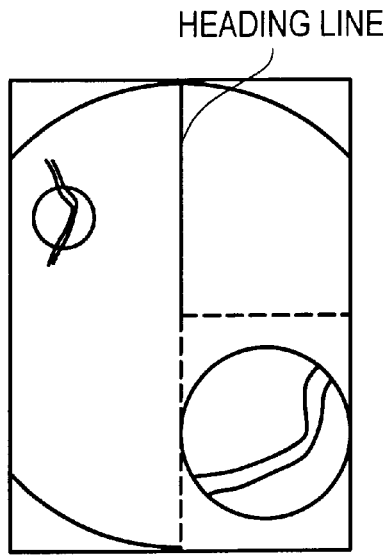
FIGS. 6(A) to 6(D) are diagrams illustrating how the radar picture varies as a result of progressive changes in the ship's heading according to the first embodiment.
Figure 6B:
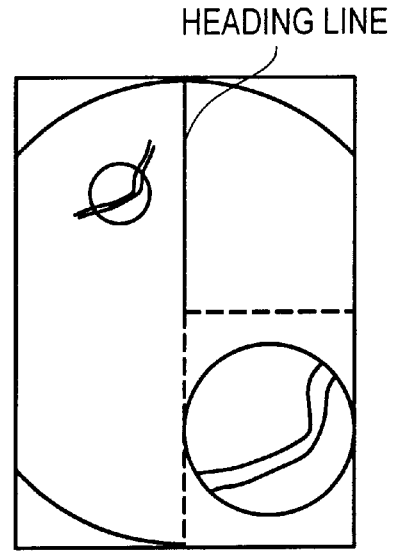
Figure 6C:
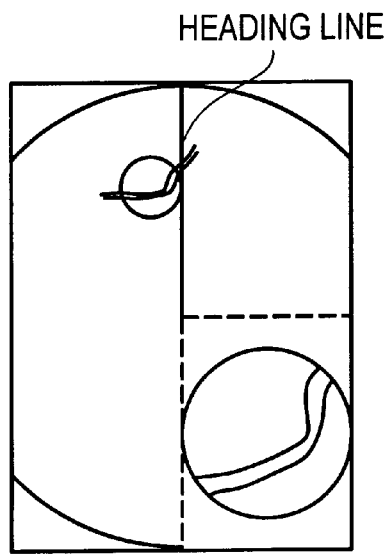
Figure 6D:
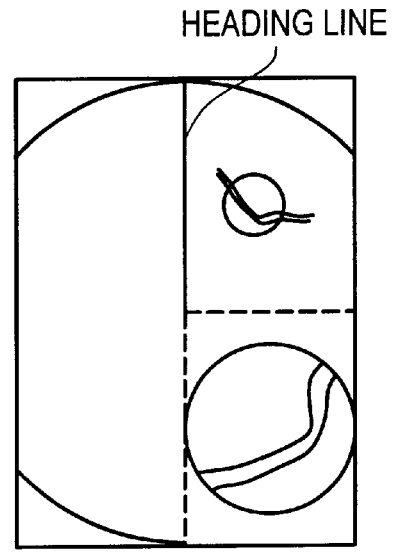

FIGS. 4(A) to 4(D) show how the larger window E1 and smaller window E2 are used in the first embodiment. FIG. 4(A) is a diagram in which a zooming area set within a coverage of the larger window E1 is enlarged in the smaller window E2 in the same way as shown in FIG. 3, and FIG. 4(B) is a diagram in which an area larger than the area displayed in the larger window E1 is shown in the smaller window E2 on a reduced scale. In the presentation shown in FIG. 4(B), the larger window E1 enables an operator to observe an area of particular interest in great detail while the smaller window E2 provides a convenient means for recognizing an image of the whole radar coverage in which the area shown in the larger window E1 is included. FIG. 4(C) is a display example in which the larger window E1 and smaller window E2 present images of a common monitoring area. It is to be noted, however, that the larger window E1 shows an image in the head-up mode in which the ship's heading is used as a reference direction which is maintained at the top of the screen while the smaller window E2 shows an image in the north-up mode in which the geographical north is used as a reference direction which is stabilized at the top of the screen. Contrary to this, the smaller window E2 may present an image in the head-up mode and the larger window E1 in the north-up mode. Furthermore, one window (E1 or E2) may present an image in the course-up mode in which the ship's intended course (or the direction to a next waypoint) is used as a reference direction which is stabilized at the top of the screen with the other window presenting an image in the head-up mode. In either case, reference directions for the larger window E1 and smaller window E2 can be selected independently of each other in this embodiment. FIG. 4(D) is a combination of the presentations depicted in FIG. 4(B) and FIG. 4(C), wherein the smaller window E2 covers a larger area than what is shown in the larger window E1, and the larger window E1 shows an image in the head-up mode while the smaller window E2 shows an image in the north-up mode.

FIGS. 5(A) to 5(D) illustrate how the image of the whole radar coverage displayed in the larger window E1 and that of a zooming area set within the larger window E1 and displayed in the smaller window E2 appear when the ship travels. As the ship advances straight ahead from a position shown in FIG. 5(A), a target object displayed in the larger window E1 moves as depicted in FIGS. 5(A), 5(B), 5(C) and 5(D) in this order. However, the smaller window E2 shows a stationary image of the same target object (provided that it is not moving) in a fixed picture orientation since the relative position of the zooming area set within larger window E1 is successively updated in accordance with the ship's movement.

FIGS. 6(A) to 6(D) illustrate how the image of the whole radar coverage displayed in the larger window E1 and that of a zooming area set within the larger window E1 and displayed in the smaller window E2 appear when the ship alters its heading. Provided that the larger window E1 is set to the head-up mode, a target object displayed in the larger window E1 rotates clockwise relative to the ship's heading as depicted in FIGS. 6(A), 6(B), 6(C) and 6(D) when the ship alters its heading to the port side. If the smaller window E2 is set to the north-up mode, however, the smaller window E2 continuously shows the image of the same target object (provided that it is stationary) in a fixed picture orientation regardless of the change in the ship's heading.

Figure 7:
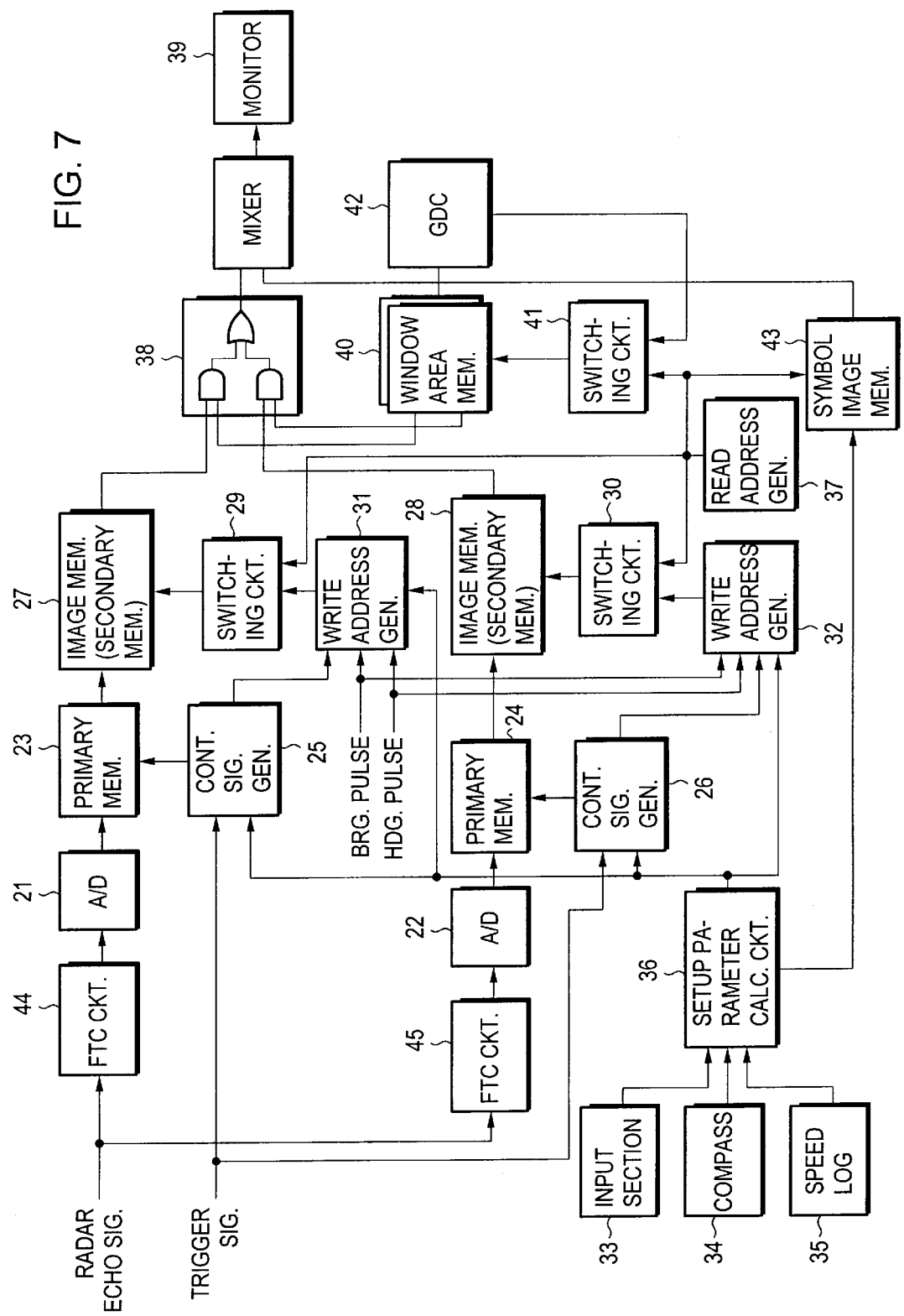
FIG. 7 is a block diagram depicting a control circuit configuration of the radar according to the first embodiment.
Figure 8A:
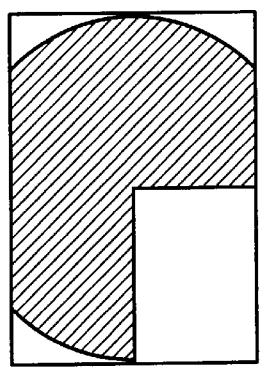
FIGS. 8(A) and 8(B) are diagrams illustrating data contents of a window area memory shown in FIG. 7.
Figure 8B:
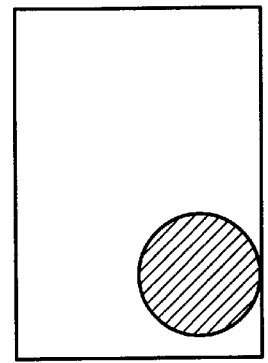

FIG. 7 is a block diagram showing a control circuit configuration of the radar according to the first embodiment. Referring to the block diagram, a pair of fast time constant (FTC) circuits 44, 45, each including a differentiating circuit, differentiate incoming radar echo signals to suppress precipitation clutter caused by rain or snow. There are provided two channels of signal lines including the FTC circuits 44 and 45 through later-described image memories (secondary memories) 27 and 28 to enable a simultaneous sweep operation on two different range scales. Since the ratio of pulselength to sweep duration differs depending on range scale settings, the anti-clutter effect against rain and snow varies between different range scales even when the differentiating circuits have the same time constant. This is why there are provided the two FTC circuits 44, 45 of which time constants can be set independently of each other depending on range scales in use. Analog-to-digital (A/D) converters 21 and 22 convert the radar echo signals of the respective channels into digital data and primary memories 23 and 24 store the A/D-converted radar echo signals obtained in each sweep duration. Control signal generators 25 and 26 generate and supply sampling clock signals to the primary memories 23 and 24, respectively. The image memories (secondary memories) 27 and 28 sequentially store in their appropriate addresses image data outputted from the primary memories 23 and 24. Following each trigger pulse, the control signal generators 25 and 26 transmit specified numbers of sampling clock pulses to the primary memories 23 and 24 and supply data on range and bearing to write address generators 31 and 32, respectively, based on a control signal having a clock signal frequency fed from a setup parameter calculating circuit 36. The write address generators 31 and 32 convert rectangular coordinates to polar coordinates and sequentially generate write addresses for the image memories 27 and 28, respectively, based on information on the amount of displacement (offset) of the ship position from the screen center, reference direction and range scale settings entered from the setup parameter calculating circuit 36, range and bearing data fed from the control signal generators 25 and 26 as well as bearing pulses and heading pulses. The setup parameter calculating circuit 36 receives information on presentation modes (head-up, north-up or course-up) for the larger window E1 and smaller window E2 and information on settings of the central points of images to be displayed in the larger window E1 and smaller window E2 and range scales entered via an input section 33 as well as the ship's heading and speed entered from a compass 34 and a speed log 35, respectively. The setup parameter calculating circuit 36 calculates, using these pieces of information, various parameters to be supplied to the write address generators 31 and 32 and performs internal settings of such parameters. A read address generator 37 generates read addresses for the image memories 27 and 28 and a window area memory 40 in synchronism with raster-scan timing of a monitor 39. Switching circuits 29, 30 and 41 supply outputs of the read address generator 37 to the image memories 27 and 28 and window area memory 40 when reading data from the respective memories. The window area memory 40 has two memory areas for the two windows (E1 and E2), in which data on display area patterns as shown in FIGS. 8(A) and 8(B) are stored. More particularly, binary data "1" is written in hatched portions shown in FIGS. 8(A) and 8(B) while binary data "0" is written in the other portions of the memory areas of the window area memory 40.

As seen from FIG. 7, data stored in the same addresses of the image memories 27 and 28 and window area memory 40 are sequentially read into a gate circuit 38 in accordance with read address signals fed from the read address generator 37. With this arrangement, image signals read from the image memory 27 are sent to the monitor 39 while the binary data "1" for the hatched portion shown in FIG. 8(A) is being read out, and image signals read from the image memory 28 are sent to the monitor 39 while the binary data "1" for the hatched portion shown in FIG. 8(B) is being read out. As a result, two radar images are displayed in the larger window E1 and smaller window E2 on the single screen as shown in FIG. 3. Designated by the numeral 42 is a graphic display controller (GDC) which writes the data on the display area patterns as shown in FIGS. 8(A) and 8(B) in the window area memory 40. A symbol image memory 43 is provided for displaying graphic symbols and other markings, like the circular symbol M displayed in the larger window E1, as illustrated in FIG. 3. The setup parameter calculating circuit 36 comprises a CPU. The setup parameter calculating circuit 36 reads information defining which part of the radar image presented in the larger window E1 should be displayed in the smaller window E2 from the input section 33 and writes, in accordance with display ranges for the larger window E1 and smaller window E2 and other settings, necessary symbols and markings in the symbol image memory 43. Data stored in the symbol image memory 43 is sequentially read out in accordance with address data outputted from the read address generator 37 so that the symbols and markings are displayed at appropriate positions on the screen as shown in the example of FIG. 3.

It is to be noted that although the symbol image memory 43 is connected directly to the setup parameter calculating circuit 36 in the foregoing embodiment, another circuit configuration is also possible. With the configuration, the setup parameter calculating circuit 36 is connected to the graphic display controller 42 which is connected to the symbol image memory 43 which is coupled to the monitor 39. The graphic display controller 42 writes necessary symbols and markings in the symbol image memory 43 in response to control signals supplied from the setup parameter calculating circuit 36. The read address generator 37 generates read addresses for the symbol image memory 43 in synchronism with raster-scan timing of a monitor 39 so that signals having been stored in the symbol image memory 43 are read out and supplied to the monitor 39.

It is also noted that although the radar echo signals are supplied both to the FTC circuits 44 and 45 in the foregoing embodiment, it is also possible to have only one FTC circuit 44 with the FTC circuit 45 removed. With this arrangement, the radar echo signals are supplied to the FTC circuit 44, and the output signals of the circuit 44 are supplied to the A/D converters 21 and 22.

Figure 9:
FIG. 9 is a timing chart illustrating waveforms observed at appropriate check points in the circuit shown in FIG. 7.

FIG. 9 is a timing chart illustrating waveforms observed at different points in the circuit shown in FIG. 7. After a trigger pulse has been entered, the radar echo signals for one sweep are sampled based on sampling clocks. To enable echo signal sampling operation for two different range scales, a pair of sampling clock signals of which frequencies are determined in accordance with the selected range scales are delivered to the primary memories 23 and 24. In a case where image data for the larger window E1 is written in the image memory 27 and image data for the smaller window E2 is written in the image memory 28 to present an enlarged view of a specific portion of the radar image shown in the larger window E1 in the smaller window E2, for example, the sampling clock signal entered to the primary memory 24 should have a shorter pulse repetition interval than the sampling clock signal entered to the primary memory 23.

Figure 10:
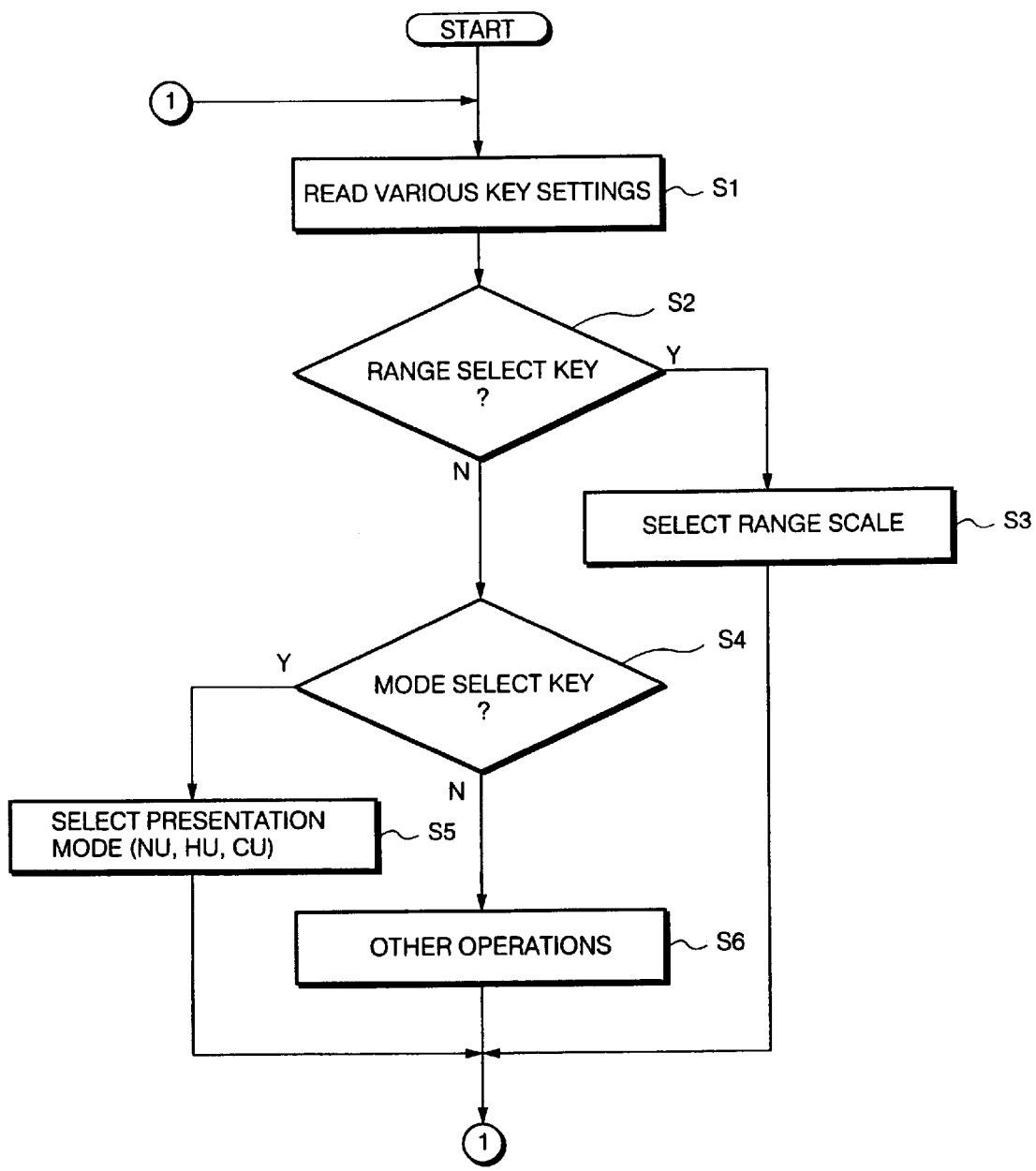
FIG. 10 is a flowchart depicting an operational sequence executed by a setup parameter calculating circuit according to the first embodiment.

FIG. 10 is a flowchart depicting an operational sequence executed by the setup parameter calculating circuit 36 shown in FIG. 7 for setting range scales and presentation modes. According to this sequence, the setup parameter calculating circuit 36 reads various key operations entered through the input section 33 (step S1). If a range select key of the radar has been operated (Yes in step S2), the setup parameter calculating circuit 36 sets the radar to a range scale specified by the key operation (step S3). More particularly, the setup parameter calculating circuit 36 stores data on the range scales individually set for the larger window E1 and smaller window E2 by the range select key and transmits that data to the control signal generators 25 and 26 and write address generators 31 and 32. If a presentation mode select key has been operated (Yes in step S4), the setup parameter calculating circuit 36 sets the radar to the north-up (NU) mode, head-up (HU) mode or course-up (CU) mode as specified by the key operation (step S5). More particularly, the setup parameter calculating circuit 36 stores data on the choice of presentation modes individually set for the larger window E1 and smaller window E2 by the presentation mode select key and transmits data on reference directions for the radar images shown in the larger window E1 and smaller window E2 in accordance with the specified presentation modes to the write address generators 31 and 32.

Figure 11:
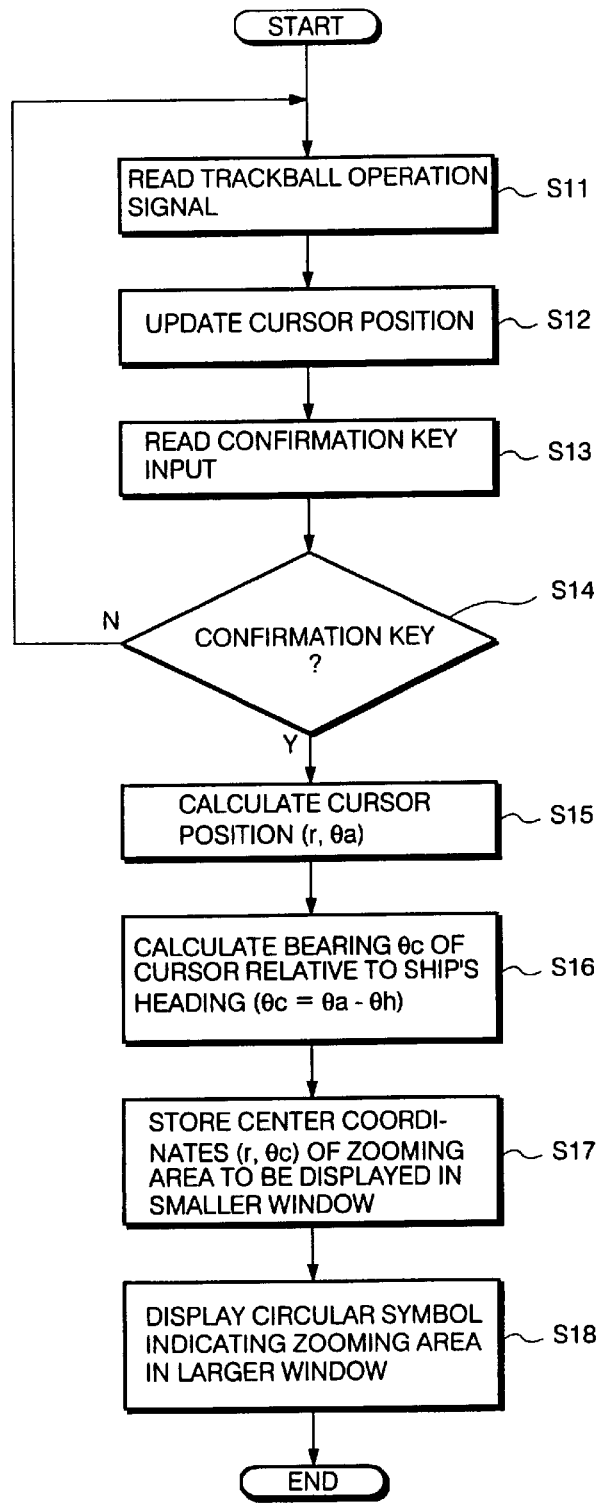
FIG. 11 is a flowchart depicting another operational sequence executed by the setup parameter calculating circuit according to the first embodiment.

FIG. 11 is a flowchart depicting an operational sequence for setting a zooming area within the whole radar coverage shown in the larger window E1 of FIG. 3. First, the setup parameter calculating circuit 36 checks whether a trackball provided at the input section 33 has been operated (step S11). When any trackball operation has been detected, the setup parameter calculating circuit 36 updates the position of a cross-hair cursor C shown in FIG. 3 in accordance with the trackball operation (step S12) and waits for an input from a confirmation key (step S13). When the confirmation key has been operated (Yes in step S14), polar coordinates (r, qa) of the current cursor position relative to the ship position are calculated (step S15), More particularly, coordinate r representative of the distance from the ship to the position indicated by the cursor C is calculated based on the on-screen cursor position and selected range scale, and coordinate θa representative of the true bearing (referenced to the geographical north) of the cursor position is calculated from the reference direction (true bearing of screen top direction) set for the radar image in the larger window E1 and the on-screen cursor position. Bearing θc of the cursor C relative to the ship's heading is then calculated from the equation θc=θa−θh (step S16), where θh is the ship's heading. Coordinates (r, θc) thus obtained are stored as parameters defining the center of the zooming area (step S17). Next, a circular symbol M indicating the zooming area to be enlarged in the smaller window E2 is displayed in the larger window E1 to make it easy to recognize a relationship between areas presented in the larger window E1 and smaller window E2 (step S18). Specifically, data for displaying the circular symbol M around the center of the zooming area in the larger window E1, the radius of the circle corresponding to the range scale set for the smaller window E2, is written in the symbol image memory 43.

Figure 12:
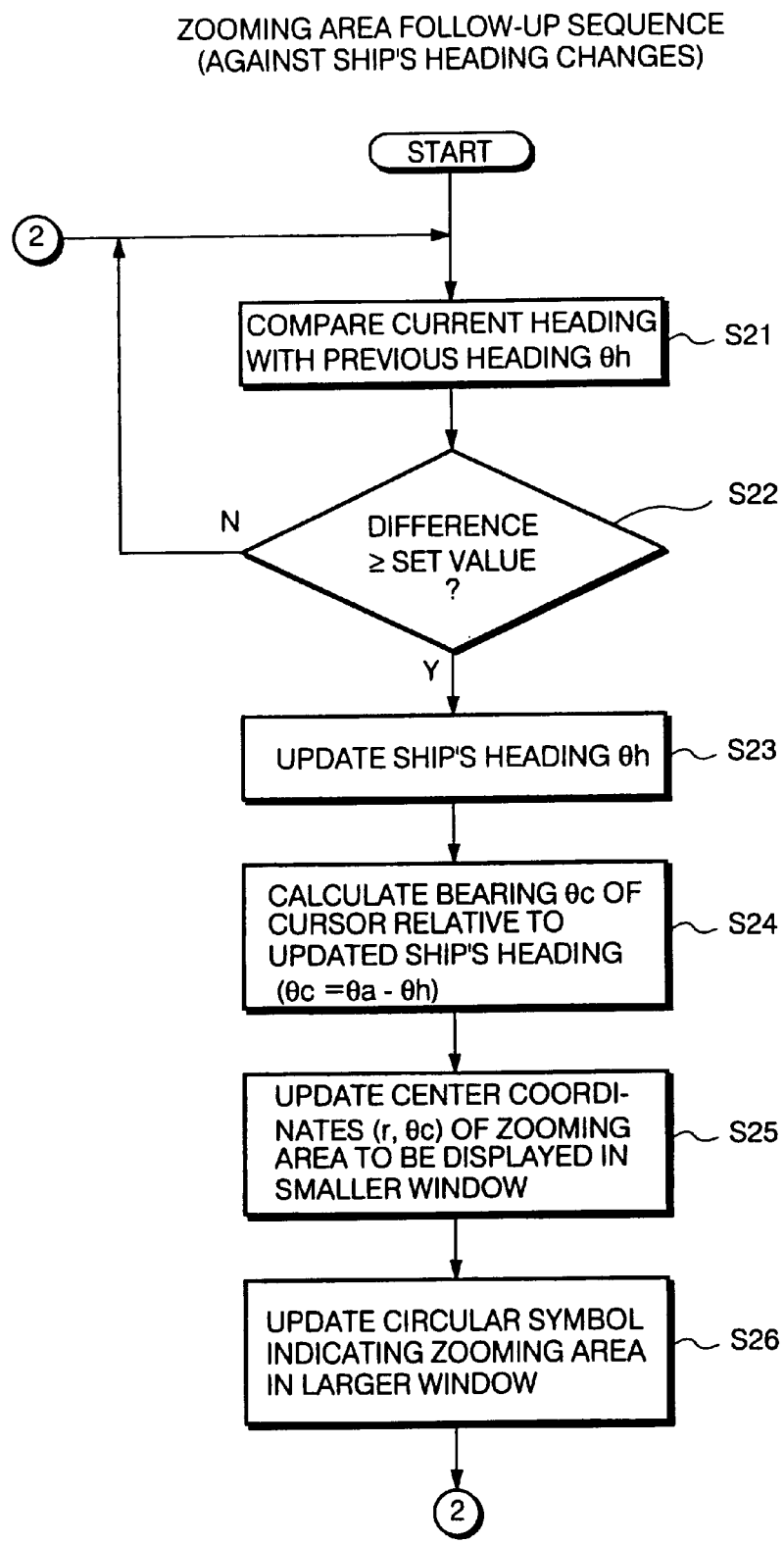
FIG. 12 is a flowchart depicting still another operational sequence executed by the setup parameter calculating circuit according to the first embodiment.

FIG. 12 is a flowchart depicting an operational sequence for keeping watch on the zooming area when the ship alters its heading. First, the setup parameter calculating circuit 36 compares the ship's current heading fed from the compass 34 with its previous heading θh (step S21). If there is a difference between the two readouts equal to or exceeding a specified value (Yes in step S22), the ship's heading data θh is updated to the latest readout (step S23). The bearing θc of the cursor C relative to the updated ship's heading is calculated (step S24) and coordinates (r, θc) defining the center of the zooming area are also updated (step S25). It is to be noted that the value r is not changed as it is assumed here that the distance to the zooming area remains the same. Then, the data for displaying the circular symbol M stored in the symbol image memory 43 is updated and the circular symbol M indicating the zooming area to be enlarged is rewritten in the larger window E1 (step S26).

Figure 13:
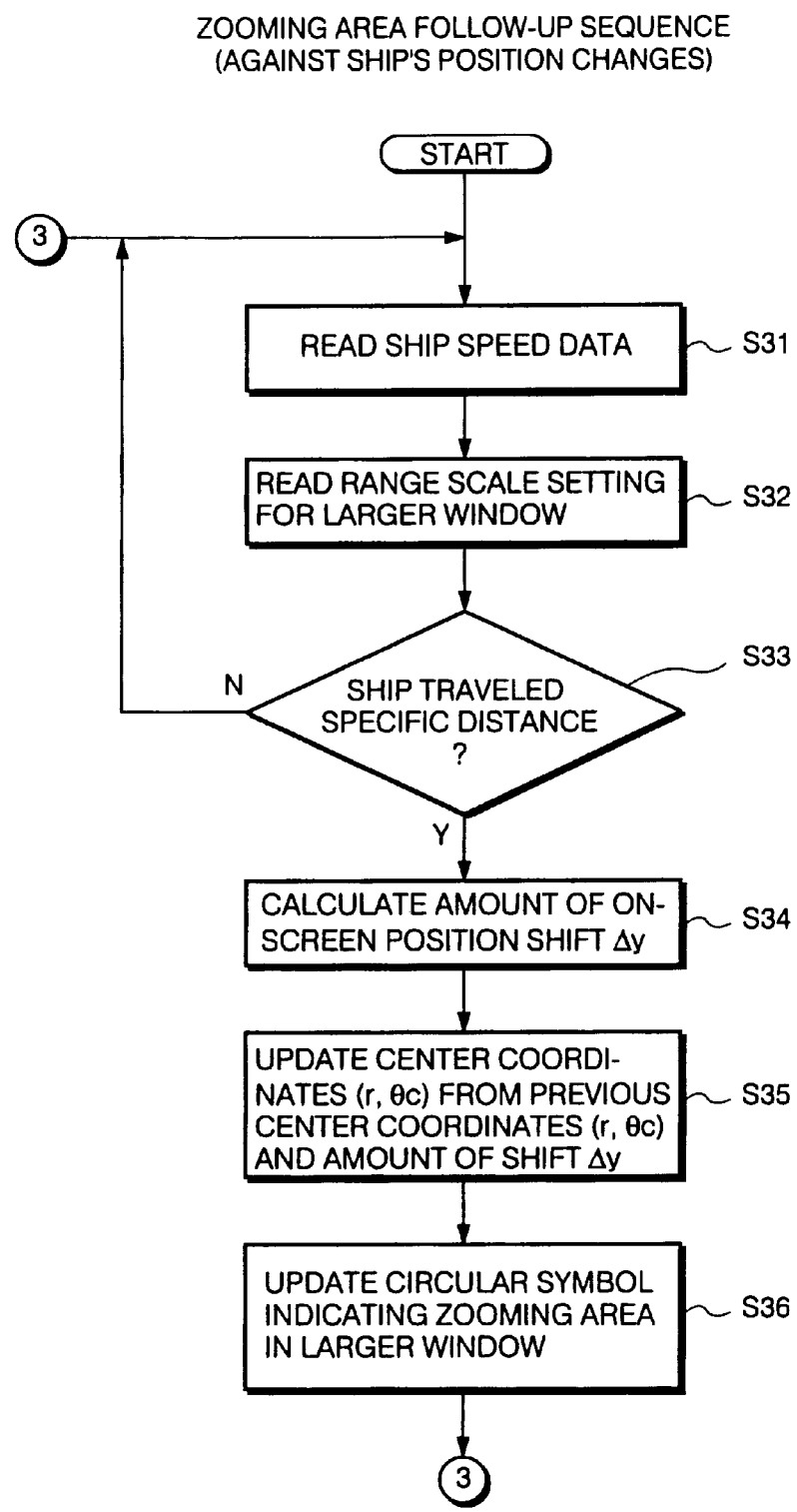
FIG. 13 is a flowchart depicting yet another operational sequence executed by the setup parameter calculating circuit according to the first embodiment.

FIG. 13 is a flowchart depicting an operational sequence for keeping watch on the zooming area when the ship moves in its forward direction. First, the setup parameter calculating circuit 36 reads ship speed information from the speed log 35 (step S31) as well as the current range scale setting for the larger window E1 (step S32). Next, it is judged whether the ship has traveled such a distance that is sufficient to shift the radar image shown in the larger window E1 by as much as one or more pixel (step S33). If it is judged that the ship has traveled such a distance (Yes in step S33), the amount of on-screen position shift Δy in the larger window E1 is calculated (step S34) and the coordinates (r, θc) of the center of the zooming area are updated (step S35) by using equations shown below:

$$r = \sqrt{(r\sin\theta c)^2 + (r\cos\theta c - Dy)^2}$$
$$\theta c = \tan\{r \cdot \sin\theta c / (r \cdot \cos\theta c - \Delta y)\}$$

Then, the data for displaying the circular symbol M stored in the symbol image memory 43 is updated and the circular symbol M indicating the zooming area to be enlarged is rewritten in the larger window E1 (step S36).

The larger window E1 and smaller window E2 can be set to desired presentation modes and range scales independently of each other in the above-described first embodiment. The embodiment may be varied in such a way that the choice of presentation modes and/or range scales for the two windows is interlocked. As an example, the operation of the setup parameter calculating circuit 36 may be so preprogrammed that the smaller window E2 is automatically set to the north-up mode or course-up mode when the larger window E1 is set to the head-up mode, or the larger window E1 is automatically set to the north-up mode or course-up mode when the smaller window E2 is set to the head-up mode. In another example, the operation of the setup parameter calculating circuit 36 may be so preprogrammed that the smaller window E2 is set to a larger range scale than the larger window E1 as shown in FIGS. 4(B) and 4(D).

A radar according to a second embodiment of the invention is now described with reference to FIGS. 14 to 16.

Figure 14:
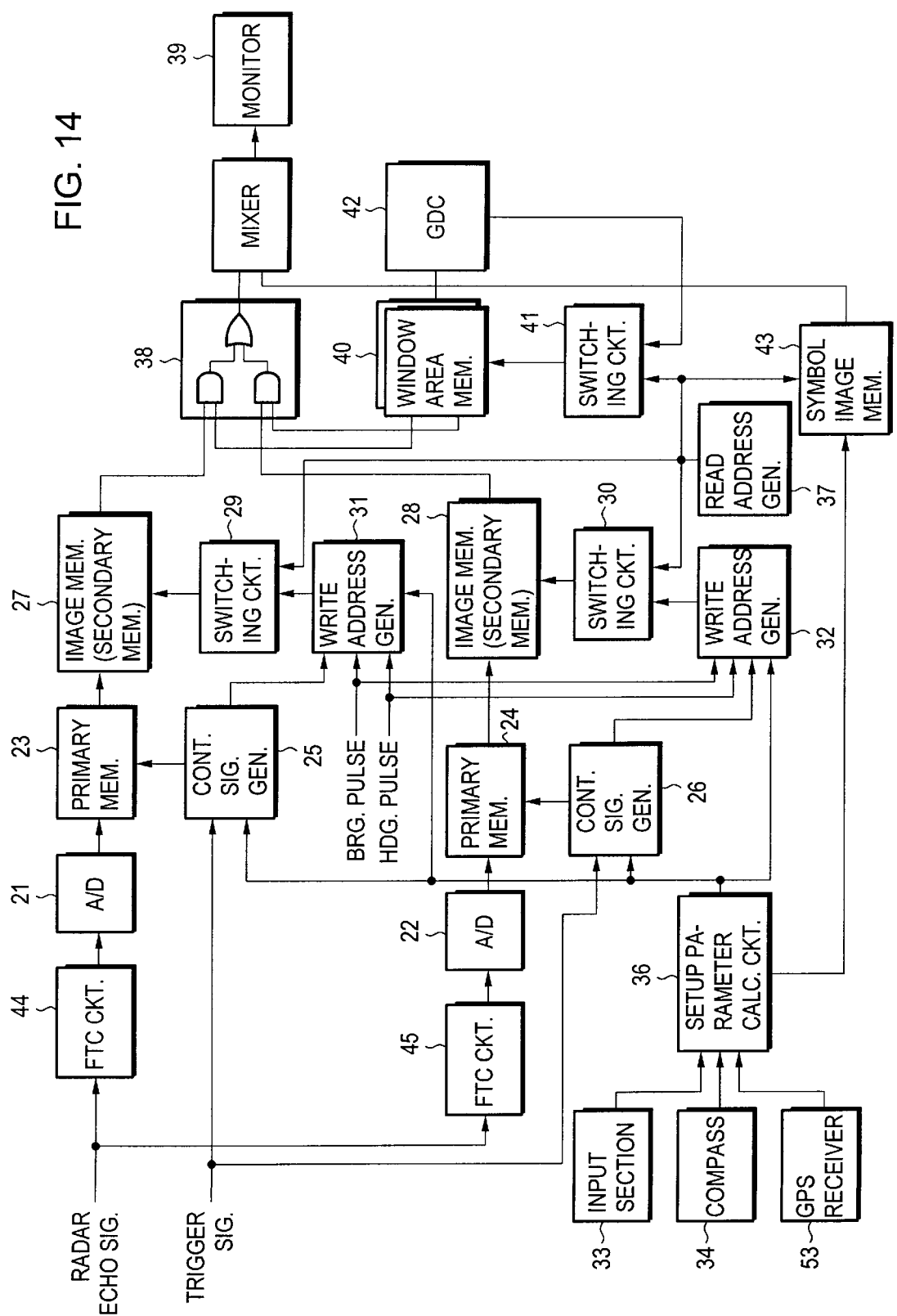
FIG. 14 is a block diagram depicting a control circuit configuration of a radar according to a second embodiment of the invention.

FIG. 14 is a block diagram showing a control circuit configuration of a radar according to the second embodiment. The configuration of FIG. 14 differs from that of the first embodiment shown in FIG. 7 in that an output of a global positioning system (GPS) receiver 53 is entered to a setup parameter calculating circuit 36 of FIG. 14 whereas an output of the speed log 35 is entered to the setup parameter calculating circuit 36 of FIG. 7. The configuration of FIG. 14 is otherwise identical to that of FIG. 7.

Figure 15:
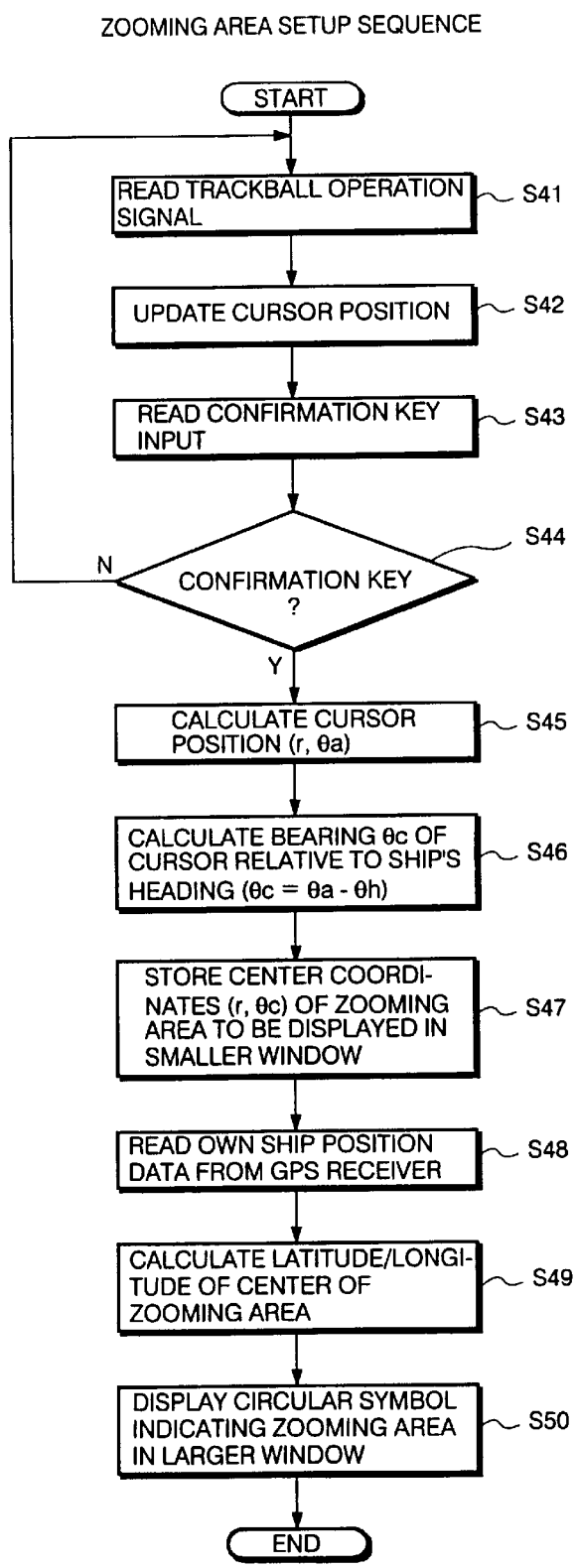
FIG. 15 is a flowchart depicting an operational sequence executed by a setup parameter calculating circuit according to the second embodiment.

FIG. 15 is a flowchart depicting an operational sequence for setting a zooming area within the whole radar coverage shown in the larger window E1 of FIG. 3. First, the setup parameter calculating circuit 36 checks whether a trackball provided at an input section 33 has been operated (step S41). When any trackball operation has been detected, the setup parameter calculating circuit 36 updates the position of a cross-hair cursor C shown in FIG. 3 in accordance with the trackball operation (step S42) and waits for an input from a confirmation key (step S43). When the confirmation key has been operated (Yes in step S44), polar coordinates (r, θa) of the current cursor position relative to the ship position are calculated (step S45). More particularly, coordinate r representative of the distance from the ship to the position indicated by the cursor C is calculated based on the on-screen cursor position and selected range scale, and coordinate θa representative of the true bearing (referenced to the geographical north) of the cursor position is calculated from the reference direction (true bearing of screen top direction) set for the radar image in the larger window E1 and the on-screen cursor position. Bearing θc of the cursor C relative to the ship's heading is then calculated from the equation θc=θa−θh (step S46), where θh is the ship's heading. Coordinates (r, θc) thus obtained are stored as parameters defining the center of the zooming area (step S47). Next, the setup parameter calculating circuit 36 reads data on the ship position in terms of latitude and longitude (step S48) and calculates the latitude and longitude of the center of the zooming area from the latitude/longitude data of the ship and the coordinates (r, θc) (step S49). Then, a circular symbol M indicating the zooming area to be enlarged in the smaller window E2 is displayed in the larger window E1 to make it easy to recognize a relationship between areas presented in the larger window E1 and smaller window E2 (step S50).

Figure 16:
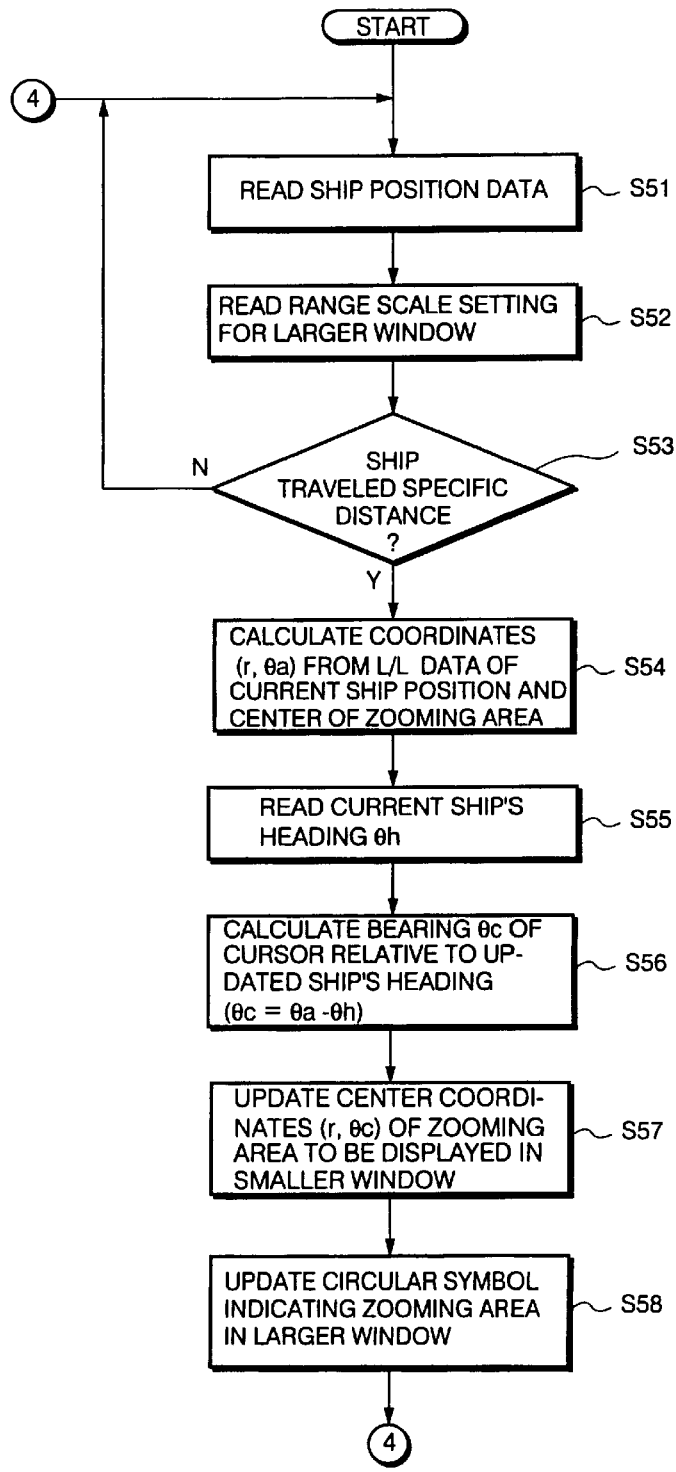
FIG. 16 is a flowchart depicting another operational sequence executed by the setup parameter calculating circuit according to the second embodiment.

FIG. 16 is a flowchart depicting an operational sequence for keeping watch on the zooming area when the ship travels. First, the setup parameter calculating circuit 36 reads the data on the current ship position from the GPS receiver 53 (step S51) as well as the current range scale setting for the larger window E1 (step S52). Next, it is judged whether the ship has traveled such a distance that is sufficient to shift the radar image shown in the larger window E1 by as much as one or more pixel (step S53). If it is judged that the ship has traveled such a distance (Yes in step S53), polar coordinates (r, θa) of the center of the zooming area relative to the updated ship position are calculated from latitude/longitude data of the current ship position and the center of the zooming area (step S54). Then, the ship's current heading θh is read from a compass 34 (step S55), the bearing θc of the cursor C relative to the ship's heading is calculated (step S56) and coordinates (r, θc) defining the center of the zooming area are updated (step S57). Finally, data for displaying the circular symbol M stored in a symbol image memory 43 is updated and the circular symbol M indicating the zooming area to be enlarged is rewritten in the larger window E1 (step S58).

A scanning sonar according to a third embodiment of the invention is now described with reference to FIGS. 17 and 18.

Figure 17:
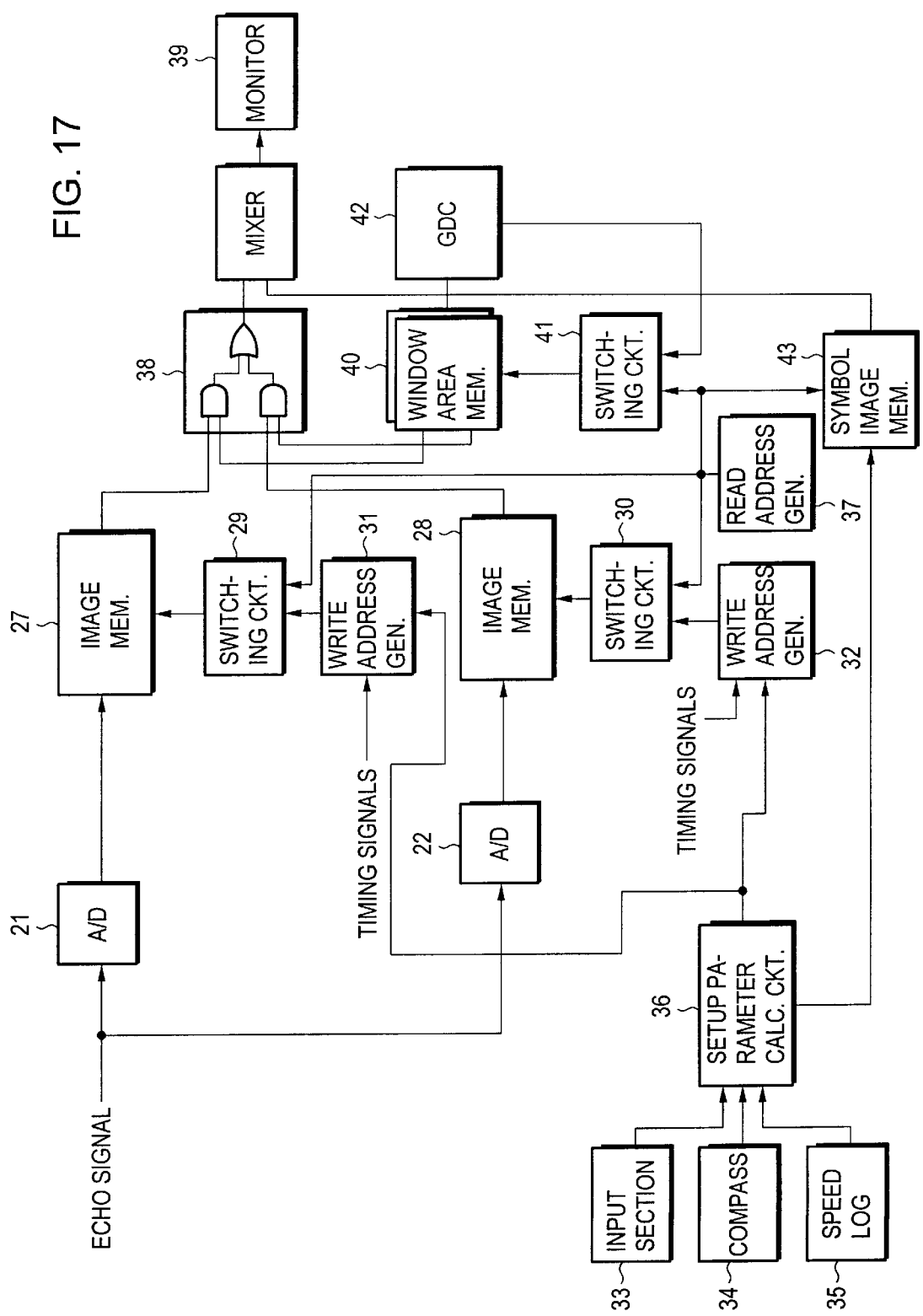
FIG. 17 is a block diagram depicting a control circuit configuration of a scanning sonar according to a third embodiment of the invention.

FIG. 17 is a block diagram showing a control circuit configuration of the scanning sonar according to the third embodiment. Referring to the block diagram, A/D converters 21 and 22 convert incoming echo signals of a pair of channels into digital data and image memories 27 and 28 store the A/D-converted echo signals in their appropriate addresses. Write address generators 31 and 32 generate write addresses for the image memories 27 and 28, respectively, based on various timing signals including transmit/receive timing signals which control transmission and reception of ultrasonic pulses. A setup parameter calculating circuit 36 receives information on settings of range scales and the central points of images to be displayed in a larger window E1 and smaller window E2 entered via an input section 33 as well as the ship's heading and speed entered from a compass 34 and a speed log 35, respectively. The setup parameter calculating circuit 36 calculates, using these pieces of information, various parameters to be supplied to the write address generators 31 and 32 and performs internal settings of such parameters. A read address generator 37 generates read addresses for the image memories 27 and 28 and a window area memory 40 in synchronism with raster-scan timing of a monitor 39. Switching circuits 29, 30 and 41 supply outputs of the read address generator 37 to the image memories 27 and 28 and window area memory 40 when reading data from the respective memories. The window area memory 40 and the monitor 39 as well as a gate circuit 38, a graphic display controller (GDC) 42 and a symbol image memory 43 have the same configuration and functions as those shown in FIG. 7.

Figure 18:
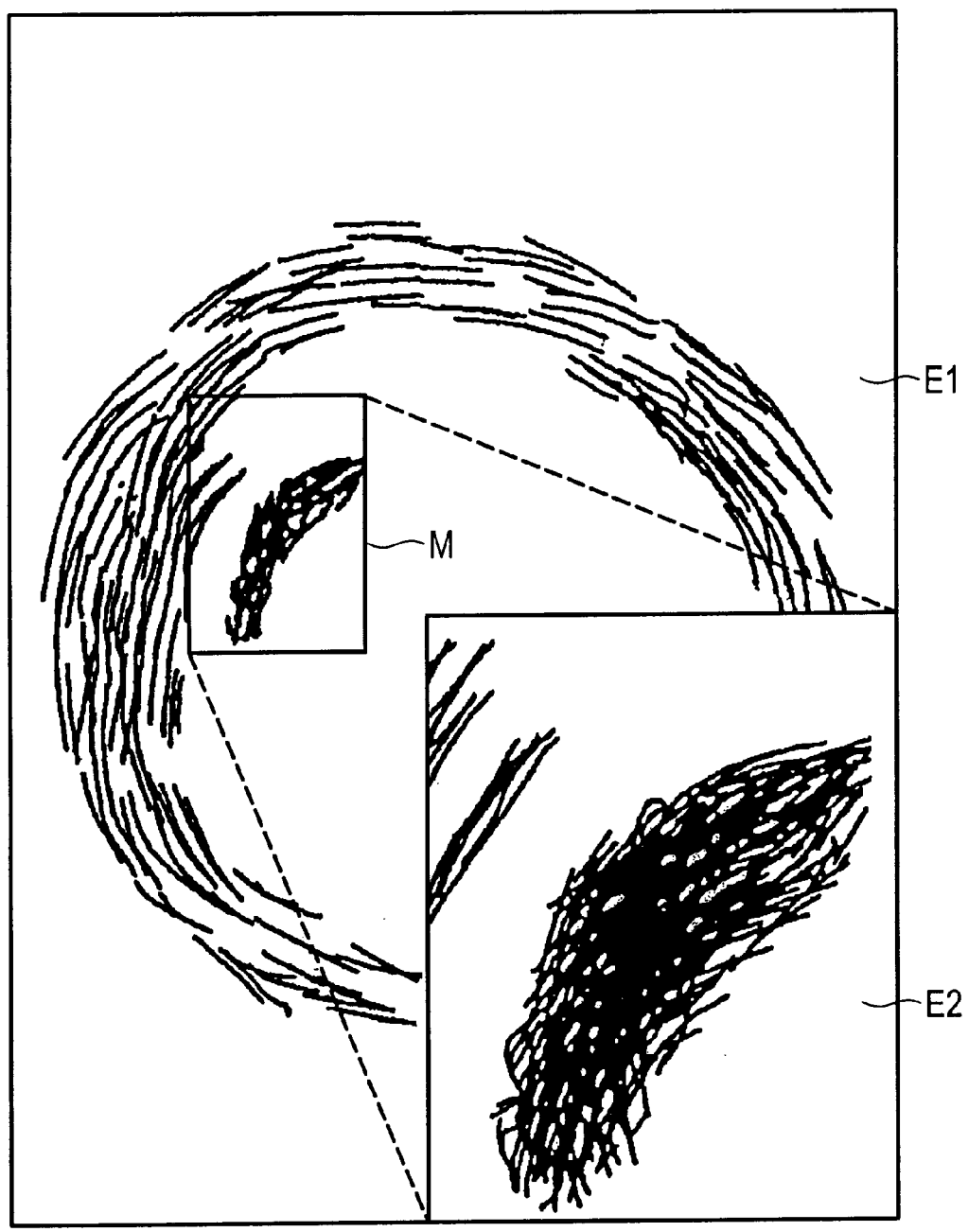
FIG. 18 is a diagram illustrating an example of a picture displayed by the scanning sonar according to the third embodiment.

FIG. 18 is a diagram showing an example of a picture displayed by the scanning sonar of the third embodiment, in which a larger window E1 presents an image of detected echoes around an observer's own ship while a smaller window E2 presents an enlarged view of a specific portion of the image shown in the larger window E1. As previously described with reference to the radars of the first and second embodiments, the observer places an on-screen cursor on a specific fish school, for example, and operates a confirmation key to designate a particular area of interest (zooming area). The fish school is then zoomed in the smaller window E2, allowing the observer to see its details.

It is possible to choose reference directions for the larger window E1 and smaller window E2 independently of each other, whereby the setup parameter calculating circuit 36 and write address generators 31 and 32 work together to present images on the larger window E1 and smaller window E2 in their respective picture orientations in a manner similar to the earlier description of the radars of the first and second embodiments. In addition, the setup parameter calculating circuit 36 and write address generators 31 and 32 automatically update the relative location of the zooming area when the ship travels or alters its heading so that the smaller window E2 continuously shows echoes detected within the zooming area.

A course plotting device according to a fourth embodiment of the invention is now described with reference to FIGS. 19 and 20.

Figure 19:
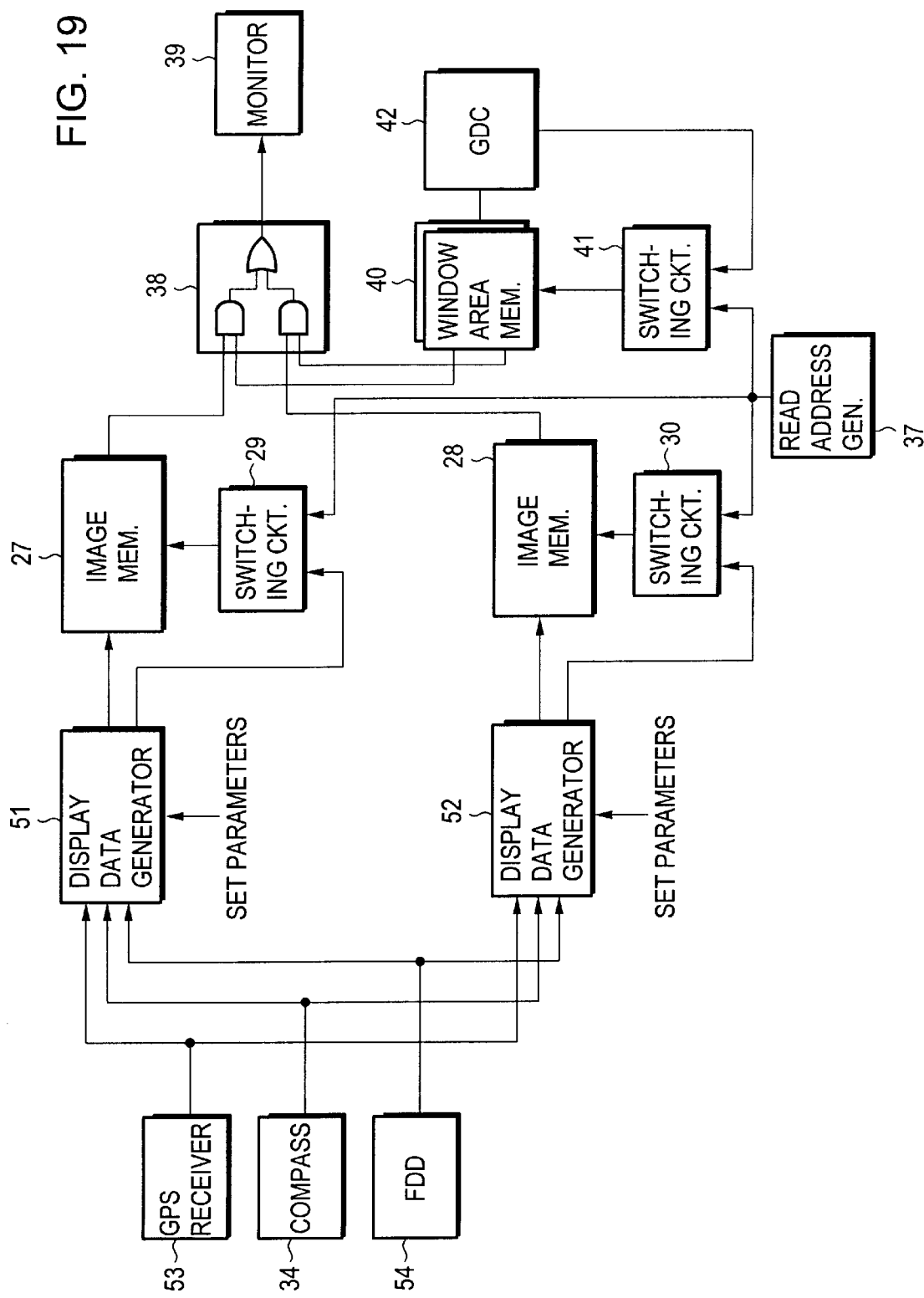
FIG. 19 is a block diagram depicting a control circuit configuration of a course plotting device according to a fourth embodiment of the invention.

FIG. 19 is a block diagram showing a control circuit configuration of the course plotting device according to the fourth embodiment. Referring to the block diagram, display data generators 51 and 52 generate data representative of graphic symbols and other markings including a ship's track in accordance with parameters set through an input section, and information on the ship's position and heading fed from a GPS receiver 53 and a compass 34 and write such data in image memories 27 and 28, respectively. Also, the display data generators 51 and 52 receive chart data from a floppy disk drive (FDD) 54 and write chart data including coastlines in the image memories 27 and 28, respectively. Other parameters entered to the display data generators 51 and 52 include scale factors, picture orientations concerning reference direction settings (north-up, head-up or course-up mode), picture movements concerning reference direction settings (true motion or relative motion mode), coordinates (latitude, longitude) of the screen center and on-screen positions of the centers of a larger window E1 and a smaller window E2, for example. The display data generators 51 and 52 write data on the ship's track and the chart data including coastlines in the image memories 27 and 28, respectively, in accordance with such parameters.

Figure 20:
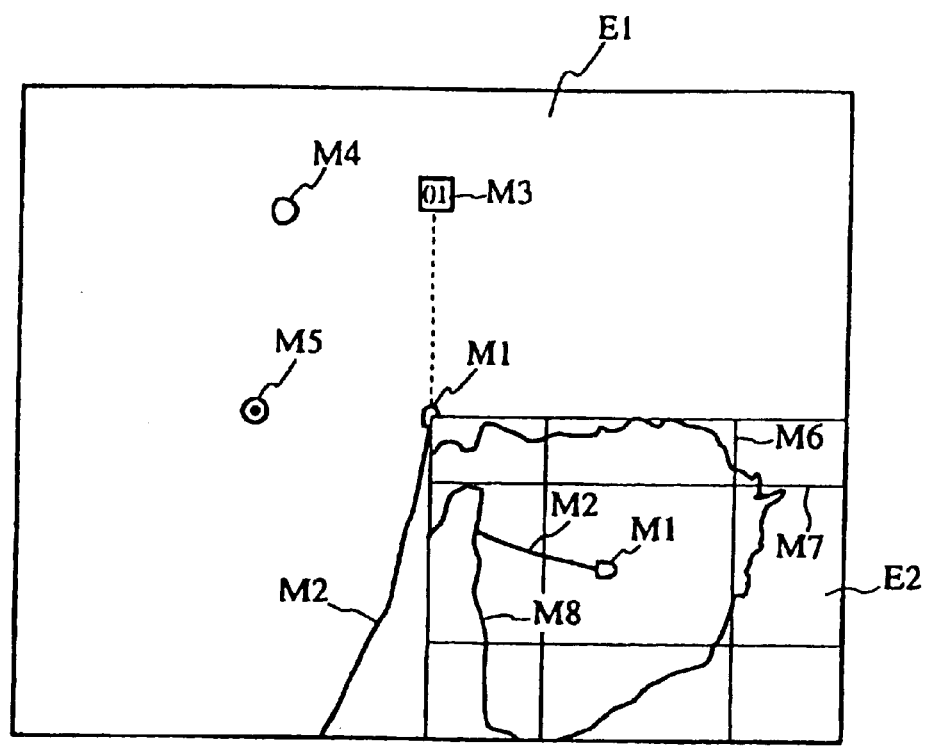
FIG. 20 is a diagram illustrating an example of a picture displayed by the course plotting device according to the fourth embodiment.

FIG. 20 is a diagram showing an example of a picture displayed by the course plotting device of the fourth embodiment, in which designated by M1 is an own ship mark, designated by M2 is the ship's past track, designated by M3 is a destination mark, designated by M4 and M5 are ancillary symbols, designated by M6 and M7 are latitude and longitude grid lines, and designated by M8 is a coastline. In the example of FIG. 20, the larger window E1 is set to the course-up relative motion mode whereas the smaller window E2 is set to the north-up true motion mode, It would be recognized from the above discussion that the course plotting device of the this embodiment allows an observer to monitor the ship's track and current position in different presentation modes in the two windows (E1 and E2). The independently displaying feature provides greater flexibility in monitoring a ships movement and relationship with nearby objects according to different reference directions. In addition, independently displaying the images ensures that the focused ship will stay in the viewing screens because the ship will not move out of the viewing area. The zoomed image will focus on the ship instead of the area.

What is claimed is:

1. An image monitoring apparatus for displaying target objects on a screen of an indicator, comprising:

an image generating circuit for generating a first image having a first reference direction representative of an area and a second image having a second reference direction of a particular portion of the area with the reference directions of the first and second images aligned independently of each other with a specified direction of the screen; and a display controller for independently displaying the images generated by said image generating circuit in separate display windows on the screen.

2. An image monitoring apparatus for detecting target objects existing within a monitoring area centered around a point of observation and for displaying a first image of detected target objects having a first reference direction on the screen of an indicator, said image monitoring apparatus comprising:

a zooming area setter for setting a zooming area within the monitoring area;

an image generating circuit for continuously generating a second image of target objects existing within the zooming area and having a second reference direction regardless of a movement of the point of observation or a change in the reference direction of the monitoring area; and a display controller for independently displaying the image of the zooming area generated by said image generating circuit, wherein the reference directions of the first and second images are aligned independently of each other with a specified direction of the screen.

3. An image monitoring apparatus for detecting target objects existing within a monitored area and for displaying images of detected target objects on the screen of an indicator, said image monitoring apparatus comprising:

a zooming area setter for setting a zooming area within the monitored area;

a display controller capable of obtaining an image of target objects existing within the set zooming area and independently displaying the image of the zooming area and images existing within the monitored area in separate display windows created on the same screen with different reference directions that are aligned independently of each other; and a zooming area indicator for displaying a symbol indicating the zooming area in the display window covering the monitored area.

4. An image monitoring apparatus which reads out chart data including data on a coastline and marks existing within a monitoring area from a storage medium, determines a ship's track from its past positions and displays the ship's track overlaid with an electronically generated chart on a screen, said image monitoring apparatus comprising:

an image generating circuit for generating a first image having a first reference direction of the whole monitoring area and a second image having a second reference direction of a particular portion of the whole monitoring area with the reference directions of the images aligned independently of each other with a specified direction of the screen; and a display controller for independently displaying the images generated by said image generating circuit in separate display windows created on the screen.

5. An image monitoring apparatus which detects target objects existing within a monitoring area centered around a ship using a radar and displays a first image of detected target objects having a first reference direction on a screen, said image monitoring apparatus comprising:

a zooming area setter for setting a zooming area within the monitoring area;

an image generating circuit for continuously generating a second image of target objects existing within the zooming area and having a second reference direction regardless of a movement of the ship or a change in the ship's heading; and a display controller for independently displaying the image of the zooming area and the image of the whole monitoring area, wherein the reference directions of the first and second images are aligned independently of each other with a specified direction as on the screen.

6. An image monitoring apparatus which detects target objects existing within an underwater monitoring area centered around a ship using a scanning sonar and displays a first image of detected target objects on a screen, said image monitoring apparatus comprising:

a zooming area setter for setting a zooming area within the monitoring area;

an image generating circuit for continuously generating a second image of target objects existing within the zooming area and having a second reference direction regardless of a movement of the ship or a change in the ship's heading; and a display controller for independently displaying the image of the zooming area and the image of the whole monitoring area, wherein the reference directions of the first and second images are aligned independently of each other with a specified direction as on the screen.

7. An image monitoring apparatus which detects target objects existing within a monitoring area centered around a ship by means of a radar and displays images of detected target objects in a plurality of display windows created on a single screen, said image monitoring apparatus comprising:

a range selector for setting a display range for each of the display windows;

a plurality of fast time constant (FTC) circuits for differentiating radar echo signals by applying time constants suited for individual display range settings;

a plurality of image generating circuits for generating images for the individual display windows in accordance with the respective display range settings based on output signals of the relevant FTC circuits; and a display controller for independently displaying the images generated by said image generating circuits in the relevant display windows.

8. An image monitoring apparatus which detects target objects existing within a monitoring area centered around a ship by means of a radar and displays images of detected target objects in a larger display window and a smaller display window created on a single screen, and image monitoring apparatus comprising:

a presentation mode selector for setting one display window to one of a north-up mode and a course-up mode and the other display window to a head-up mode wherein the north-up mode maintains geographic north in a top direction of the single screen, the course-up mode maintains an intended course of the ship in the top direction of the single screen and the head-up mode maintains a direction of the ship in the top direction of the single screen; and a display controller for independently displaying the images of the detected target objects in the selected presentation modes in the corresponding display windows respectively.

9. An image monitoring apparatus which detects target objects existing within a monitoring area centered around a ship by means of a radar and displays images of detected target objects in a larger display window and a smaller display window created on a single screen, said image monitoring apparatus comprising a display controller for displaying an image of target objects detected within a specified zooming area in the larger display window and an image of target objects detected within an area larger than the zooming area in the smaller display window.

10. An image monitoring apparatus which detects target objects existing within a monitoring area centered around a ship by means of a radar and displays images of detected target objects in a larger display window and a smaller display window created on a single screen, and image monitoring apparatus comprising:

a presentation mode selector for setting one of the larger display window and the smaller display window to one of a north-up mode and a course-up mode and the other of the larger display window and the smaller display window to a head-up mode wherein the north-up mode maintains geographic north in a top direction of the single screen, the course-up mode maintains an intended course of the ship in the top direction of the single screen and the head-up mode maintains a direction of the ship in the top direction of the single screen;

a range selector for setting a larger display range for the smaller display window than for the larger display window; and a display controller for independently displaying the images of the detected target objects in the selected presentation modes in the corresponding display windows respectively.

11. An image monitoring apparatus for displaying target objects on a screen of an indicator, comprising:

means for generating a first image having a first reference direction of an area and a second image having a second reference direction of a particular portion of the area with the reference directions of the first and second images aligned independently of each other with a specified direction of the screen; and means for independently displaying the images generated by the means for generating in separate display windows on the screen.

12. The image monitoring apparatus of claim 11, further comprising indicator means for displaying a symbol indicating the particular portion of the area within the display window covering the area.

13. The image monitoring apparatus of claim 11, further comprising a plurality of fast time constant circuits for differentiating radar echo signals by applying time constants suited for individual display range settings.

14. The image monitoring apparatus of claim 11, wherein one of the separate display windows is a smaller display window and another of the display windows is a larger display window that is larger than the smaller display window, and further comprising:

a range selector for setting a larger display range for the smaller display window than for the larger display window.

15. The image monitoring apparatus of claim 14, further comprising a presentation mode selector for setting one of the larger display window and the smaller display window to one of a north-up mode and a course-up mode and the other of the larger display window and the smaller display window to a head-up mode.

16. A method of displaying target objects on a screen of an indicator, comprising:

generating a first image having a first reference direction of an area and a second image having a second reference direction of a particular portion of the area with the reference directions of the first and second images aligned independently of each other with a specified direction of the screen; and independently displaying the generated images in separate display windows on the screen.

17. The method of claim 16, further comprising displaying a symbol indicating the particular portion of the area within the display window covering the area.

18. The method of claim 16, further comprising differentiating radar echo signals using a plurality of fast time constant circuits by applying time constants suited for individual display range settings.

19. The method of claim 16, wherein one of the separate display windows is a smaller display window and another of the display windows is a larger display window that is larger than the smaller display window, and further comprising:

setting a larger display range for the smaller display window than for the larger display window.

20. The method of claim 19, further comprising setting one of the larger display window and the smaller display window to one of a north-up mode and a course-up mode and the other of the larger display window and the smaller display window to a head-up mode.

* * * * *